United States Patent [19]
Webberley

[11] Patent Number: 5,433,296
[45] Date of Patent: Jul. 18, 1995

[54] BRAKE MONITORING AND WARNING SYSTEM

[75] Inventor: Floyd A. Webberley, Carson, Wash.

[73] Assignee: Brake Monitoring Systems, Inc., Cascade Locks, Oreg.

[21] Appl. No.: 259,778

[22] Filed: Jun. 14, 1994

[51] Int. Cl.$^6$ .......................... F16D 66/00; B60Q 1/00
[52] U.S. Cl. ...................... 188/1.11; 73/121; 340/454; 340/518; 188/79.55
[58] Field of Search ................ 188/1.11, 79.55, 106 P, 188/151 A, 181 T, 71.1, 3 R, 3 H; 73/121, 129, 122; 340/453, 454, 518, 525; 116/208; 200/83 R, 61.4, 61.44; 92/5 R; 303/9.61, 20, 7, 113.4; 192/30 W; 91/1; 338/32 H

[56] References Cited

U.S. PATENT DOCUMENTS

| | | | |
|---|---|---|---|
| 2,087,386 | 7/1937 | Norton | 340/454 |
| 2,873,436 | 2/1959 | Avrea | 188/1.11 |
| 2,981,929 | 4/1961 | Rizzo et al. | 340/454 |
| 3,339,676 | 9/1967 | Quinn | 340/454 X |
| 3,363,232 | 1/1968 | Mizsak | 340/454 |
| 3,716,831 | 2/1973 | Rikard et al. | 340/454 |
| 3,776,329 | 12/1973 | Hope et al. | 188/1.11 |
| 4,361,832 | 11/1982 | Cole | 340/518 X |
| 4,441,100 | 4/1984 | Galloway | 340/518 |
| 4,520,663 | 6/1985 | Moore et al. | 73/129 |
| 4,642,603 | 2/1987 | Martinez, Jr. . | |
| 4,674,326 | 6/1987 | Reinecke | 188/1.11 X |
| 4,757,300 | 7/1988 | Sebalos . | |
| 4,776,438 | 10/1988 | Schandelmeier . | |
| 4,800,991 | 1/1989 | Miller . | |
| 4,855,712 | 8/1989 | Wiley, Jr. et al. . | |
| 4,937,554 | 6/1990 | Herman . | |
| 5,002,164 | 3/1991 | Bowyer . | |
| 5,090,779 | 2/1992 | Kramer . | |
| 5,206,625 | 4/1993 | Davis . | |
| 5,226,509 | 7/1993 | Smith . | |
| 5,253,735 | 10/1993 | Larson et al. | 188/1.11 |
| 5,285,190 | 2/1994 | Humphreys et al. . | |
| 5,320,198 | 6/1994 | Hoyt et al. | 188/79.55 |
| 5,339,069 | 8/1994 | Penner et al. | 340/454 |
| 5,347,260 | 9/1994 | Ginzel et al. | 340/525 |
| 5,353,009 | 10/1994 | Marsh et al. | 340/518 |
| 5,358,075 | 10/1994 | Jarzombek | 188/1.11 |

*Primary Examiner*—Douglas C. Butler
*Attorney, Agent, or Firm*—Robert D. Varitz

[57] ABSTRACT

A brake monitoring and warning system is intended for use on a motor vehicle (110), and more particularly is intended for use on tractor-trailer combinations. The vehicle includes plural, powered brakes. Each brake includes a brake activation arm (18) and a mechanism (16) for shifting the brake activation arm between a brake-off position and a brake-applied position, such as an air-driven cylinder. The monitoring and warning system includes a sensor (26) which is connected to the brake-activation arm (18) and monitors the position of the brake-activation arm. The sensor generates and transmits a brake condition signal which is representative of a safety condition of the brake associated with a particular brake activation arm. A logic mechanism is connected to the sensors and receives and interprets the brake condition signal. Visual (160, 162) and auditory (164) warning devices are connected to the logic mechanisms for warning the vehicle operator of the safety condition of the brakes on the vehicle. The logic mechanism includes a function selector (152) or selecting between an automatic-scan mode of operation and a brake-selective mode of operation. An auxiliary display (70, 90) may be located adjacent each braked wheel on the vehicle.

15 Claims, 3 Drawing Sheets

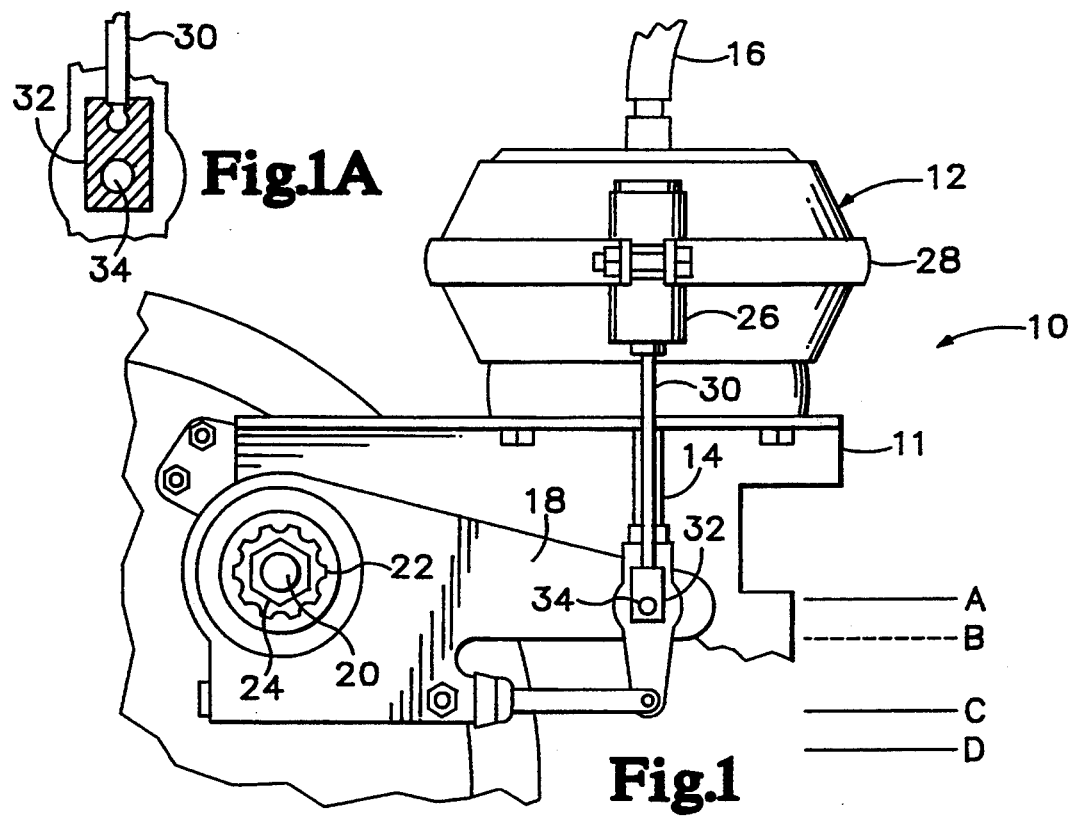
Fig.1A
Fig.1
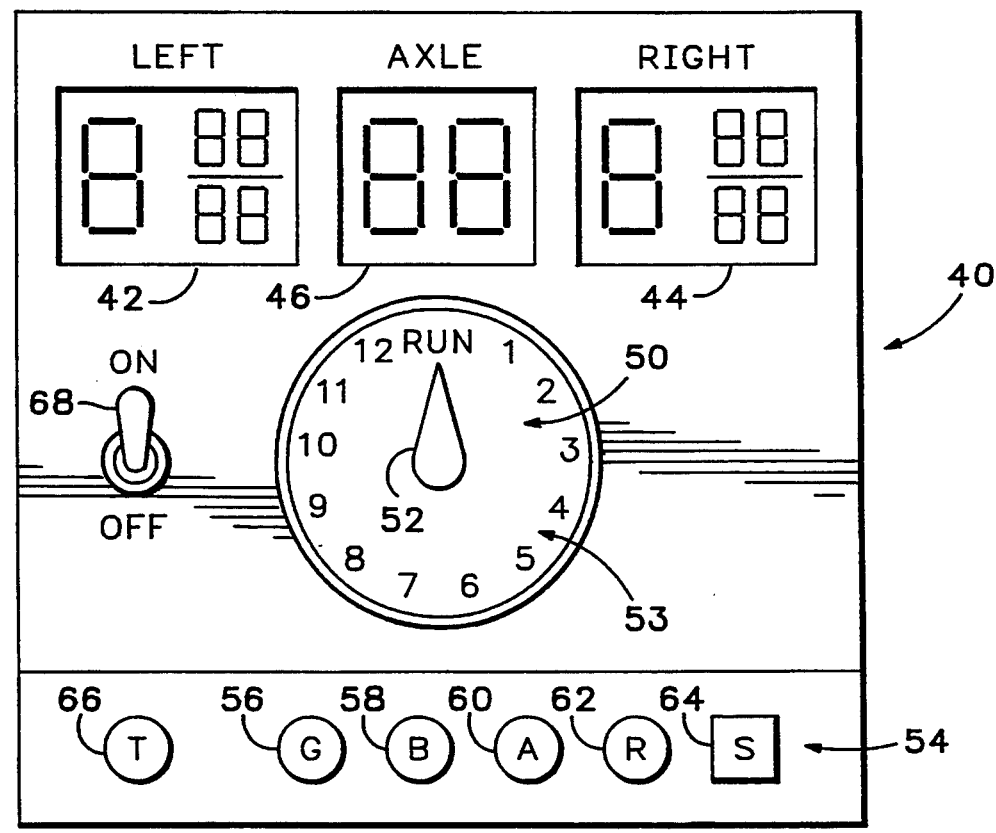
Fig.2

BRAKE MONITORING AND WARNING SYSTEM

TECHNICAL FIELD

The invention relates to truck safety devices, and specifically to the provision of an electronic read out which may be located in the cab of a tractor/trailer rig and which provides a real-time report of the condition and adjustment of all of the brakes on the vehicle.

BACKGROUND ART

Although the primary focus for the intended use of this invention is on large trucks and tractor-trailer combinations it should be appreciated that the invention is also suitable for use on all vehicles which have independent brakes for each wheel. The larger vehicles generally incorporate an air-brake system. These brakes must be properly adjusted in order to function, and various standards have been set by state governments and the Federal Department of Transportation (DOT) to insure that brakes are properly adjusted and are therefore operable to stop the vehicles when the need arises.

One standard that has been set by the DOT is a requirement that the travel of an actuator rod, which extends from a brake air cylinder to an activation arm on the brake mechanism, have a travel distance of two inches or less. A brake is deemed to be out of adjustment if the activation arm travel is two or more inches. Travel distances between 1.75 inches and two inches are considered to be marginally safe.

Newer vehicles have self-adjusting brakes and it is estimated that at this time, approximately forty percent of the vehicles on the road have such self adjustors. Even with the self-adjusting brakes, the slack adjustors, as they are known in the trade, will sometimes fail to operate or will become inoperative as a result of the build up of petrochemical products and dirt in the slack adjustment mechanism and allow brakes to get out of adjustment. Older vehicles do not have self-adjustment mechanism at all. Regardless of whether the vehicle is equipped with slack adjustors or not, it is still required that the driver physically inspect the brakes on the tractors and trailers to insure that they am properly adjusted and am properly operating. As might be expected, this task is not always performed, particularly in inclement weather conditions. If, however, a brake is determined to be out of adjustment, it may be quickly adjusted by the truck operator, with a minimal expenditure of energy and with the use of a few hand tools.

Vehicle brakes are inspected at check points, such as the familiar weight stations which are found along highways. As in the case of the driver, an inspector must generally crawl under the truck to inspect the travel of the actuator arms to insure that they are in compliance with federal and state regulations. Such inspection must be done for each brake on the vehicle, which generally requires that the driver remain in the truck and operate the brakes while the inspector visually checks each brake mechanism.

A number of monitoring devices have been provided for use on trucks. Some of these monitor air pressure to determine if the brakes are operating safely, others provide a warning only after the brake travel has exceeded legal limits, while still others provide a purely visual indication which still requires the operator to visual check every brake on the. truck.

U.S. Pat. No. 5,285,190 to Humphries, et al disclosed an automatic slack adjustor which incorporates a monitoring system which alerts the vehicle operator that a brake somewhere on the vehicle is not operating properly, or is out of adjustment, but does not provide any mechanism for identifying the specific brake that is out of adjustment, nor does the system identify any quantitative information about a particular brake.

U.S. Pat. No. 4,937,554 to Herman provides a monitoring system which incorporates a push rod oscillator-type sensor to provide an analog output which is related to the push rod extension distance, which output is used along with pressure in the brake system to determine whether or not a brake is operating properly.

U.S. Pat. No. 4,800,991 to Miller discloses a brake maintenances monitor which utilizes a mechanical flag to provide an indication that the brake actuator arm has exceeded its safe distance. Additionally, an electronic warning device is provided which will momentarily provide a warning light on the dashboard of the vehicle.

DISCLOSURE OF THE INVENTION

The brake monitoring and warning system of the invention is intended for use on a motor vehicle, and more particularly is intended for use on tractor-trailer combinations. The vehicle includes plural, powered brakes. Each brake includes a brake activation arm and a mechanism for shifting the brake activation arm between a brake-off position and a brake-applied position, such as an air-driven cylinder. The monitoring and warning system includes a sensor which is connected to the brake-activation arm and monitors the position of the brake-activation arm. The sensor generates and transmits a brake condition signal which is representative of a safety condition of the brake associated with a particular brake activation arm. A logic mechanism is connected to the sensors and receives and interprets the brake condition signal. Visual and auditory warning devices are connected to the logic mechanisms for warning the vehicle operator of the safety condition of the brakes on the vehicle. The logic mechanism includes a function selector for selecting between an automatic-scan mode of operation and a brake-selective mode of operation. An auxiliary display may be located adjacent each wheel brake on the vehicle.

An object of the instant invention is to provide a brake monitoring and warning system which will provide a continuous check on the safety condition of the brakes on the vehicle.

Another object of the invention is to provide a system which provides a remote visual and auditory warning if a brake is out of adjustment.

A further object of the invention is to provide a system which provides a quantitative display of the travel of any given brake on the vehicle and provides information to the operator as to the overall operating condition of the brake system for the vehicle.

These and other object and advantages of the invention will become more fully apparent as the description which follows is read in connection with the drawings.

BRIEF DESCRIPTION OF THE DRAWINGS

FIG. 1 is a side elevation of a brake mechanism and sensor of the invention.

FIG. 1A is an enlarged portion of FIG. 1 depicting a break-away connector of the invention.

FIG. 2 is a diagrammatic plan view of a control panel of the invention.

BEST MODE FOR CARRYING OUT THE INVENTION

Figure 3:
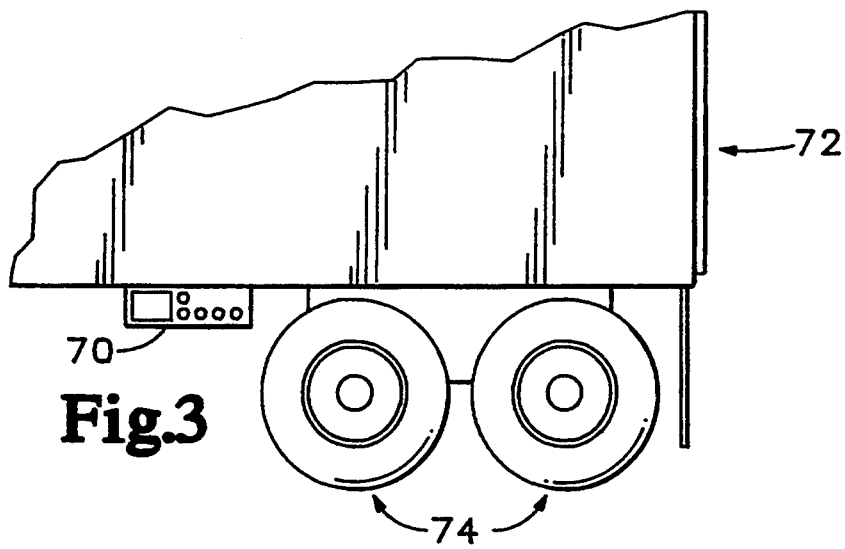
FIG. 3 is a side elevation of a trailer and an auxiliary display of the invention.

The brake monitoring and warning system of the invention is intended as an addition to a conventional brake system on a vehicle which includes plural, generally air-powered brakes. Referring now to the drawings, and initially to FIG. 1, a conventional brake activation mechanism is depicted generally at 10. Mechanism 10 is carried on a brake cylinder mounting plate 11 and includes an air cylinder 12 having a push rod 14 extending therefrom. An air hose 16 is connected to cylinder 12 and provides a source of pneumatic pressure to activate the brake cylinder.

Push rod 14 is connected to a brake-activation arm 18, which in turn is connected to a shaft 20, which applies pressure to the brake pads (not shown) which are operable, with the brake drum (also not shown) to stop the vehicle. A slack-adjustment mechanism is depicted generally at 22 and is operable to maintain the brakes in proper adjustment. The slack-adjustment mechanism automatically keeps the brakes properly adjusted, however, a manual adjustment is also provided at 24, and may be adjusted simply with the application of an appropriate wrench. As previously noted, not all vehicles have automatic slack adjustment mechanism and require manual adjustment of vehicle brakes.

As is known to those of skill in the art, where dual wheels are provided on the trucks, a single brake mechanism is utilized for both wheels in a set. Thus, a tractor-trailer combinations having eighteen wheels, includes two steered wheels on the front of the tractor, each of which is equipped with a brake mechanism. The tractor also includes four powered wheeled sets, each with a single brake mechanism. The trailer which is attached to the "fifth wheel" of the tractor has four sets of wheels, each set containing two wheels and having a single brake mechanism. In some jurisdictions, up to three trailers may be pulled by a single tractor.

As previously noted, DOT standards require a travel for push rod 14 of two inches or less. In order to monitor the amount of travel of push rod 14, and hence brake-activation arm 18, a sensor 26 is secured to air cylinder 12 by means of a clamp 28. A sensor arm 30 extends from sensor 26 and is connected with push rod 14 and brake activation arm 18. A break-away connector 32 is provided so that the brake will operate without damage to sensor 26 in the event that sensor arm 30 is restricted in its movement, as by a collection of frozen water and/or road grime. Connector 32 is secured to activation arm 18 by means of a pivot 34, which is an extension of the connection between push rod 14 and activation arm 18. Break away connector 32 may take any number of forms, such as the form which is shown, which includes a channel about the periphery of sensor arm 30 and a conformal receptacle within connector 32. This construction allows sensor arm 30 to separate from connector 32 in the event that sensor arm 30 is unable to move When the brake is applied.

Sensor 26 may take a variety of forms which are well known in the art, although some form of digital encoding device is preferable to an analog sensor. In the preferred embodiment, a linear encoder is used, which may include either an electrical, electromechanical or optical transducer or encoder. The sensor is operable to detect and monitor the position of-the brake activation arm and for generating and transmitting a brake condition signal which is representative-of a safety condition of the brake associated with the brake activation arm. The sensor may also transmit an identification signal or code to identify the axle number or wheel location. This is a requirement if the brake condition signals are multiplexed on a single bus.

It should be appreciated that when the vehicle is in an operating condition, and when the brakes are in a brake-off position, push rod 14 and brake activation arm 18 are fully retracted, thus fully releasing the brakes, as indicated at line "A" in FIG. 1. When the operator applies the brakes, a positive pressure occurs in air hose 16 and the side of air cylinder connected to the air hose, push rod 14 extends, thereby shifting activation arm 18 into a brake-applied position. When the vehicle engine is shut down, thereby removing the source of air pressure for the brake system, and after all air pressure is released from an accumulator for the brake system, a spring, which is located inside of air cylinder 12, will cause push rod 14 to extend to the point that the brakes are applied, in what is equivalent to a parking brake setting for a smaller vehicle, and is represented by dashed line "B."

The system of the invention is designed to provide an indication to the vehicle operator of a number of different safety conditions of the brakes of the vehicle. The safety conditions include a fully-released condition, which occurs when the activation arm is in its brake-off position (line "A"), a parked condition, which occurs when the air pressure is released from the air hoses and the spring within air cylinder 12 partially applies pressure to the brakes (dashed line "B"). Three other brake-engaged conditions are indicated to the vehicle operator when the brake-activation arm is in the brake-applied position. The first is an engaged-safe condition, which corresponds to a activation arm movement between 0 inches (line "A") and 1.75 inches (line "B"). An engaged-marginally-safe conditions corresponds to a brake activation arm movement of between 1.75 inches and 2.0 inches (line "D"), and an engaged-unsafe condition corresponds to a brake-activation arm movement in excess of two inches (below line "D").

Turning now to FIG. 2, the control panel and display for the system is depicted generally at 40. Control panel 40, in the preferred embodiment, includes readouts for the right and left side of the vehicle. For instance, readout 42 provides a quantitative indication of the activation arm travel on the left side of the vehicle while readout 44 provides the same information for the right side of the vehicle for the same axle. Readout 46 provides an indication of an axle number for the the vehicle.

A rotary switch 50 is located on the control panel and includes a selector 52 which is operable to select any of the truck axles, as indicated by the numerals 1–12, also referred to herein as indicia, and shown generally at 53, or to select a "run" position, which allows the system to cycle through all of the axles on the truck, which is also referred to herein as an automatic-scan mode of operation. Selector 52 may also be positioned to provide a specific readout from any selected axle by moving it to alignment with the numbers 1 through 12 on switch 50, which is also referred to herein as a brake-selective mode of operation.

A row of warning lights 54 is located on the control panel and includes, in the preferred embodiment, a green light 56, a blue light 58, an amber light 60, and a red light 62, which are indicative of the safety conditions of the vehicle brakes. Additionally, a switch 64 is provided which is operable to silence an audible warning. In the preferred embodiment, if the audible warning is silenced, switch 64 illuminates a red light therein. A test button 66 is provided and, when pressed, illuminates all of the lights and displays on the control panel to provide an indication to the operator that all lights are functioning properly. Switch 68 is an on/off switch for the system.

As previously noted, the system indicates a number of safety conditions to the operator. Referring to FIGS. 1 and 2, the position of brake-activation arm 18 in a fully-released condition is indicated by line "A" in FIG. 1. In such a condition, green light 56 illuminates on control panel 40. The parked condition is indicated by dashed line "B" in FIG. 1, which results in blue light 58 being illuminated on the control panel. An engaged-safe condition occurs when activation arm 18 is between lines "A" and "C" in FIG. 1, which also results in illumination of blue light 58, which indicates safe braking condition. If the travel of activation arm is more than 1.75 inches, which is indicated by the area between lines "C" and "D", amber light 60 will illuminate. If the travel is in excess of two inches, red light 62 will illuminate and the audible warning device will sound.

Figure 4:
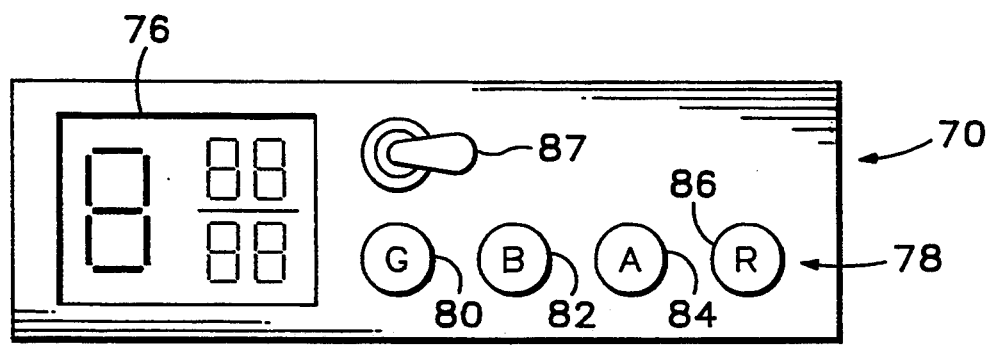
FIG. 4 is an enlarged front elevation of an auxiliary display of the invention.

In addition to the visual and auditory indicating devices located in the cab of the vehicle, auxiliary displays may be provided and may be located outside of the vehicle cab. Such devices may be located adjacent the individual wheels of the vehicle, or on an auxiliary control panel, which may be located outside of the cab. The provision of the auxiliary display is to assist inspectors when the vehicle is undergoing a safety inspection. As depicted in FIG. 3, one form of an auxiliary display 70 is depicted mounted on a trailer 72 adjacent a wheel 74. An enlarged version of auxiliary display 70 is depicted in FIG. 4, and includes a readout 76, which depicts the actual travel of activation arm 18, and a light row 78 having indicator lights 80, 82, 84 and 86 therein, which corresponds to the lights in light row 54. A selector switch 87 may be provided to select a particular axle in the situation where the vehicle has tandem wheels. Switch 87 may be arranged to indicate fore and aft axles in a pair of axles to eleminate the need for a separate auxiliary readout for each axle. A multi-position switch may be provided in the event that display 70 is used to check more than two sets of wheels.

Figure 5:
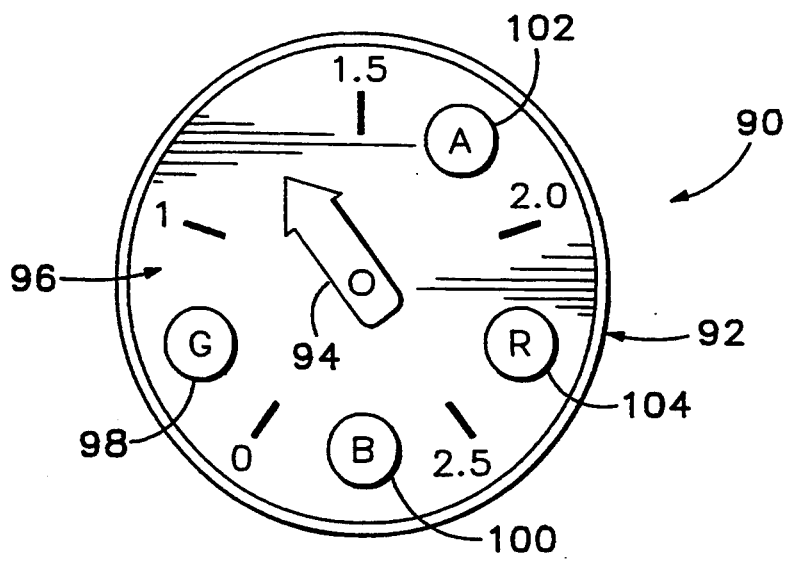
FIG. 5 is a front elevation of another embodiment of the auxiliary display of the invention.

Turning now to FIG. 5, an alternate embodiment of the auxiliary display is depicted at 90. This embodiment of the auxiliary display uses a rotary face indicator 92 having a pointer 94 and a scale 96 located about the periphery of the rotary dial. Lights 98, 100, 102 and 104 are also provided and correspond to lights in light rows 54 and 78.

Figure 6:
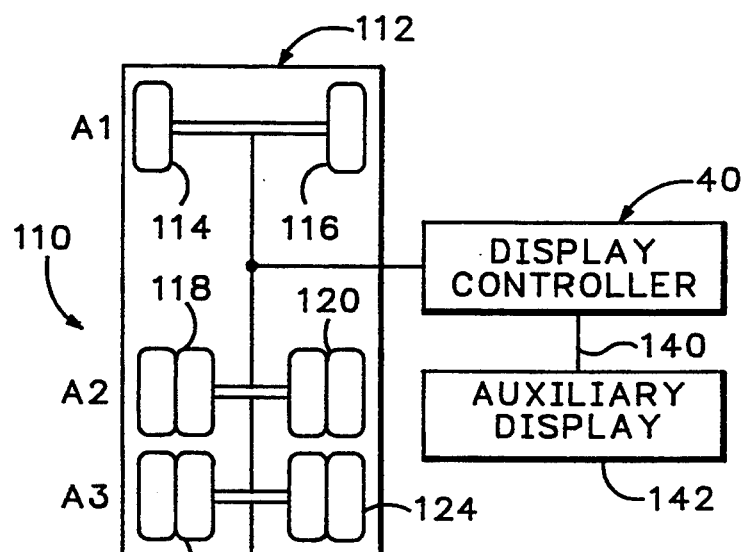
FIG. 6 is a schematic diagram of a communications bus of the system.

FIG. 6 shows a simplified schematic of a double trailer vehicle 110 having the system of the invention installed therein. Vehicle 110 includes a tractor 112 having front steering wheels 114, 116, on axle A1, and powered wheel sets 118, 120, 122 and 124, on axles A2, A3, which are dual wheels in each instance. A trailer 126 has wheel sets 127, 128, 129 and 130, on axles A4, A5, and a second trailer 132 has wheel sets 133, 134, 135 and 136, on axles A6, A7. It should be noted that axle A6 is a dolly that has a single axle trailer carried thereon. A communications bus 138 extends between all of the sensors, located at each wheel, and display controller or control panel 40. An auxiliary bus 140 is connected between control panel 40 and plural auxiliary displays 142, if such auxiliary displays are installed with the system. As shown in FIG. 6, vehicle 110 has a total of seven axles. Trailer 132 may also be configured with three axles. In certain jurisdictions, triple trailers are allowed, which may add another two or three axles to the total. Various combinations of tractors and trailers may be combined, which may result in virtually any number of axles being present in the combination. Although display 40 has been depicted with a maximum of 12 axle positions, it should be appreciated by those of skill in the art that any suitable number of axles may be represented on the display for the system.

Figure 7:
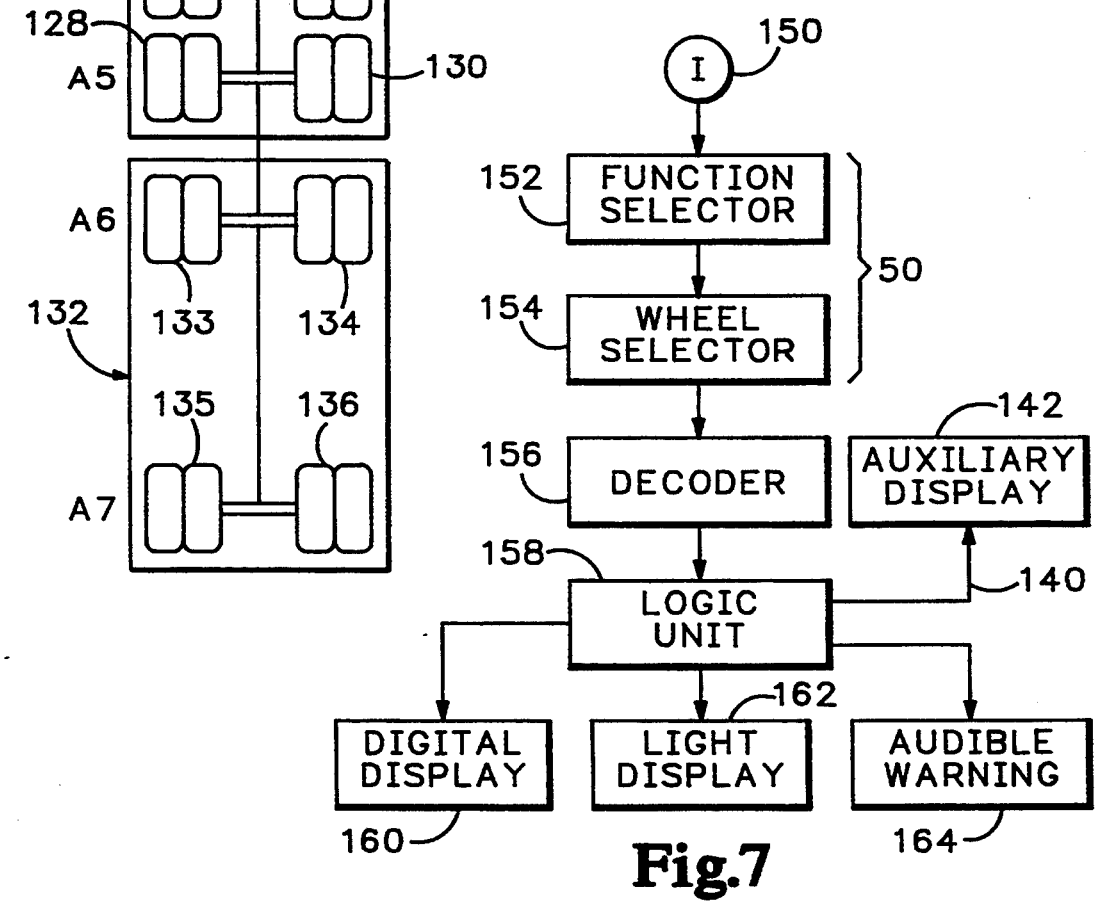
FIG. 7 is a block diagram of the control panel of the invention.

Turning now to FIG. 7, a block diagram of display controller 40 is depicted. Display controller 40 includes an interrogator 150, which is operable to interrogate the individual sensors over bus 138. A function selector 152 and a wheel selector 154 are part of rotary switch 50 and are operable to select the function and, depending on the function selected, also to select an axle or wheel for individual display. A decoder 156 is operable to decode the brake-condition signal generated by sensor 26 for each brake. A logic unit 158 is provided to receive and interpret brake condition signals from sensor 26 and to generate and transmit appropriate signals to digital displays 160, light displays 162, and audible warning device 164, as well as providing signals to auxiliary displays 142. Digital displays 160 include readouts 42, 44, and 46 and any readouts includes in auxiliary displays. Light displays include those indicator lights located in light row 54 and in any auxiliary displays. Digital display 160 and light display 162 comprise what are referred to herein as visual indicating devices. Audible warning device 164 comprises what is referred to herein as an auditory indicating device. As used herein, the term logic means includes those element of control panel 40 which are required to receive and interpret the brake condition signal, and includes interrogator 150, function selector 152, wheel selector 154, decoder 156 and logic unit 158. The system may be easily installed on existing trucks with a minimum of additional wiring and may be easily connected between the tractor and trailers. It is believed that the precise electronic configuration necessary to practice the invention is within the knowledge of those of ordinary skill in the art, and that there are any number of ways in which the system may be made to function.

In operation, when the truck is initially started, all of the brakes will be in their parking condition. If the brakes are properly adjusted and are locked, blue light 58 will illuminate on panel 40. If selector 52 is set to the run position, individual sensors will be interrogated and the amount of travel of brake activation arm 18 for each brake will be reported in readouts 42 and 44, while a readout of the axle number is simultaneously displayed on readout 46. If at any instance, blue light 58 is not illuminated and any other light is illuminated, the operator is warned that there may be a problem with a particular brake and may manually interrogate the brakes on each axle to determine which brake, if any, is malfunctioning. One it is determined which brake is not functioning properly, the operator may adjust that brake.

Once air pressure has been built up in the truck's brake system, the brakes may be released, and, assuming that all brakes are properly released, green light 56 will illuminate in light row 54. Again, if selector 52 is set to run and anything but a steady green light appears in light row 54, the operator may manually select each axle in rum to determine which brake has a problem.

In order to test the brakes on the truck, the operator may fully depress the brake pedal to apply all brakes on the tractor and trailers. If all of the brakes are properly adjusted, blue light 58 will be illuminated and the operator may be assured that all of the brakes on the vehicle are properly adjusted. The operator may maintain the brake pedal in a depressed condition and manually check each axle, paying close attention to readouts 42 and 44 to determine if any of the brakes are close to operating out of a range which qualifies as an engaged-safe condition.

As the truck proceeds on its way, selector 52 should be in the "RUN" position which will allow the brakes to be constantly monitored whenever they are applied. If a brake enters into a marginally safe or an unsafe condition, amber light 60 or red light 62, respectively, will illuminate. If any brake is not in a safe or marginally safe range, an audible warning will also sound and will continue to sound until the driver turns the warning off with switch 64. In the event that the brakes are released, red light 62 will go out, however, red light 64, associated with the audible warning device, will remain illuminated until such time as all of the brakes are restored to safe operating conditions.

Thus, a brake monitoring and warning system has been disclosed which will provide a vehicle operator with quantitative information about the condition of the brakes on a vehicle and will provide both visual and audible warnings should an unsafe condition arise. The system may be retrofitted onto existing vehicles and requires a minimum of wiring. Auxiliary readouts facilitate inspection at vehicle inspection stations, reducing the amount of time that a truck and driver must be off the road.

Although a preferred embodiment of the invention, and several variations thereto, have been disclosed herein, it should be appreciated that further variations and modifications may be incorporated in the invention without departing from the scope of the invention as defined in the appended claims.

INDUSTRIAL APPLICABILITY

The system of the invention is applicable to all wheeled vehicles with braking systems. It is particularly well suited to heavy track and trailer combinations.

I claim:

1. A brake monitoring and warning system for use on a motor vehicle (110), the vehicle includes plural, powered brakes, and wherein each brake include a brake arm (18) and a mechanism (16) for shifting the brake activation arm between a position and a brake-applied position, comprising:
   (26) connected to each brake activation arm (18) on the motor vehicle for monitoring the of the brake activation arm and for generating and transmitting a brake condition signal representative of a safety condition of the brake associated with the brake activation arm, wherein said brake condition signal includes quantitative information about the length of travel of the activation arm;
   logic means connected to said sensor (26) for receiving and interpreting said brake condition signal; and
   a control panel (40), wherein said control panel (40) includes a display (46) for identifying a particular vehicle brake, a quantitative indication (42, 44) of the travel on the activation arm (18) associated with the particular brake, and wherein said visual indicating devices include plural lights (162, 54) which are indicative of said safety condition of a particular brake, including visual (160, 162) and auditory (164) indicating devices connected to said logic means for warning a vehicle operator of said safety condition of the brakes on the vehicle, wherein said visual indicating devices provide both quantitative and qualitative output to the motor vehicle operator for every brake on the vehicle, wherein said logic means includes a function selector (152) located in said control panel (40) for selecting between an automatic-scan mode of operation and a brake-Selective mode of operation.

2. The system of claim 1 wherein said safety conditions include a fully-released condition ("A"), a parked condition ("B"), an engaged-safe condition ("A"—"C"), an engaged-marginally-safe condition ("C"—"D") and an engaged-unsafe condition (>"D").

3. The system of claim 1 wherein said visual indicating device includes an auxiliary display (70, 90).

4. The system of claim 1 wherein said sensor (26) includes an electromechanical encoder.

5. The system of claim 1 wherein said sensor (26) includes an optical encoder.

6. The system of claim 1 which includes a break-away connector (32) located between said sensor (26) and the brake activation arm (18).

7. A brake monitoring and wanting system for use on a motor vehicle (110), wherein the vehicle includes plural, powered brakes, and wherein each brake includes a brake activation arm (18) and a mechanism (16) for shifting the brake activation arm between a brake-off position and a brake-applied position, comprising:
   a sensor (26) connected to each brake activation arm (18) on the motor vehicle for monitoring the position of the brake activation arm and for generating and transmitting a brake condition signal representative of a safety condition of the brake associated with the brake activation arm, wherein said brake condition signal includes quantitative information about the length of travel of the activation arm;
   logic means connected to said sensor (26) for receiving and interpreting said brake condition signal, including a function selector (152) for selecting between an automatic-scan mode of operation and a brake-selective mode of operation, wherein said automatic-scan mode interrogates each sensor (26) on the vehicle in a predetermined sequence and wherein said brake-selective mode interrogates a selected brake on the vehicle;
   a control panel (40), wherein said control panel (40) includes a display (46) for identifying a particular vehicle brake, a quantitative indication (42, 44) of the travel on the activation arm (18) associated with the particular brake, and wherein said visual indicating devices include plural lights (162, 54) which are indicative of said safety condition of a particular brake, and wherein said control panel includes visual (160, 162) and auditory (164) indicating devices connected to said logic means for providing an indication to the vehicle operator of said safety condition of the brakes on the vehicle, wherein said visual indicating devices provide both quantitative and qualitative output to the motor vehicle operator for every brake on the vehicle, and a communications bus connected between each sensor, said logic means and said visual and auditory indicating devices.

8. The system of claim 7 wherein said safety conditions include a fully-released condition ("A"), a parked condition ("B"), an engaged-safe condition ("A"—"C"), an engaged-marginally-safe condition ("C"—"D") and an engaged-unsafe condition (>"D").

9. The system of claim 7 wherein said visual indicating device includes an auxiliary display located adjacent a brake on the vehicle (70, 90).

10. The system of claim 7 wherein said sensor (26) includes an electromechanical encoder.

11. The system of claim 7 wherein said sensor (26) includes an optical encoder.

12. The system of claim 7 Which includes a breakaway connector (32) located between said sensor (26) and the brake activation arm (18).

13. A brake monitoring and warning system for use on a motor vehicle (110), wherein the vehicle includes plural, powered brakes, and wherein each brake includes a brake activation arm (18) and a mechanism (16) for shifting the brake activation arm between a brake-off position and a brake-applied position, comprising:

a sensor (26) connected to the brake activation arm (18) for monitoring the position of the brake activation arm and an encoder for generating and transmitting a brake condition signal representative of a safety condition of the brake associated with the brake activation arm;

logic means connected to said encoder for receiving and interpreting said brake condition signal, including a function selector (152) for selecting between an automatic-scan mode of operation and a brake-selective mode of operation, wherein said automatic-scan mode interrogates each sensor on the vehicle in a predetermined sequence and wherein said brake-selective mode interrogates a selected brake on the vehicle;

a control panel (40), including a display (46) for identifying a particular vehicle brake, a quantitative indication (42, 44) of the travel on the activation arm (18) associated with the particular brake, and wherein said visual indicating device include plural lights (162, 54) which are indicative of said safety condition of a particular brake, said control panel including a selector (52) for selecting between said automatic-scan mode of operation and said brake-selective mode of operation; and visual (160, 162) and auditory (164) indicating devices connected to said logic means for providing an indication to the vehicle operator of said safety condition of the brakes on the vehicle, wherein said safety conditions include a fully-released condition ("A"), a parked condition ("B"), an engaged-safe condition ("A"—"C"), an engaged-marginally-safe condition ("C"—"D"), and an engaged-unsafe condition (>"D").

14. The system of claim 13 wherein said visual indicating device (160, 162) includes an auxiliary display (70, 90).

15. The system of claim 13 which includes a breakaway connector (32) located between said sensor (26) and the brake activation arm (18).

* * * * *